United States Patent [19]

Metzger

[11] 4,317,622
[45] Mar. 2, 1982

[54] EXPOSURE CONTROL APPARATUS FOR FLASH PHOTOGRAPHY

[75] Inventor: Lenard M. Metzger, Rochester, N.Y.

[73] Assignee: Eastman Kodak Company, Rochester, N.Y.

[21] Appl. No.: 159,420

[22] Filed: Jun. 16, 1980

[51] Int. Cl.³ .................. G03B 7/093; G03B 7/14; G03B 15/03
[52] U.S. Cl. .................................... 354/34; 354/50
[58] Field of Search .............................. 354/27, 32–35, 354/60 F, 50, 51, 129, 133, 137, 139, 145, 126

[56] References Cited

U.S. PATENT DOCUMENTS

| | | | |
|---|---|---|---|
| 4,023,187 | 5/1977 | Shenk | 354/27 |
| 4,035,813 | 7/1977 | Whiteside | 354/27 |
| 4,192,587 | 3/1980 | LaRocque et al. | 354/27 |

Primary Examiner—L. T. Hix
Assistant Examiner—William B. Perkey
Attorney, Agent, or Firm—D. I. Hague

[57] ABSTRACT

Exposure control apparatus for a camera having an objective lens, an unregulated, fixed output flash device which, in the absence of ambient light, provides one-half stop of underexposure of a photographic subject located at the near limit acceptable image focus point of the lens, and a mechanism for automatically controlling an exposure in accordance with the intensity of the ambient light. In a flash exposure mode, the mechanism is operated to produce an exposure which, in the absence of artificial illumination, would provide one-half stop of underexposure of the photographic subject. The total exposure, flash plus ambient, is within ± one-half stop of a nominally correct exposure throughout the useable depth of field of the camera lens.

9 Claims, 3 Drawing Figures

EXPOSURE CONTROL APPARATUS FOR FLASH PHOTOGRAPHY

BACKGROUND OF THE INVENTION

1. Field of the Invention

The present invention relates to photographic exposure control apparatus and, more particularly, to exposure control apparatus for automatically controlling the exposure interval of a fixed-focus camera in cooperation with a flash unit providing a fixed quantity of flash illumination.

2. Description Relative to the Prior Art

A number of prior art cameras adapted for use with a fixed output flash device, such as a flash bulb or a non-quenching electronic flash unit, and film of a particular light sensitivity ("speed") operate, in a flash mode, with a selected combination of shutter time and exposure aperture that provides a nominally "correct" exposure at one intermediate, predetermined subject distance. The exposure latitude of the film is relied upon to produce acceptable photographs at other subject distances. For example, the Kodak Instamatic 300 camera, in a flash mode has an f/8 exposure aperture and a 1/40th of a second shutter speed. With this combination of aperture and shutter speed, and with a flashcube, which has a guide number of about 64, and ASA 64 film, photographs are nominally correctly exposed at 8 feet, one stop overexposed at 5.6 feet, two stops overexposed at 4 feet, one stop underexposed at 11.3 feet and 2 stops underexposed at 16 feet. Thus, to produce acceptable photographs at all useful flash ranges (4 to 16 feet), the Instamatic 300 camera requires the use of film having an exposure latitude of at least ±two stops. This exposure latitude is widely available in films adapted for use with conventional photographic cameras. For example, acceptable photographs can be produced from conventional print films with up to 3 stops underexposure and up to 2 stops of overexposure.

The so-called "instant" films used in self-developing cameras, however, typically have an exposure latitude of approximately ±one-half stop. To provide acceptable flash photographs with film of such narrow exposure latitude, designers provide in self-processing cameras: (1) a quenchable flash unit and/or (2) an automatic exposure control system responsive to both ambient and flash light. The disadvantage of each of these approaches is that they add to the complexity and cost of the camera.

SUMMARY OF THE INVENTION

The present invention employs a new concept in still camera exposure control for flash photography. More particularly, the exposure control apparatus of the invention, in the flash mode, combines (1) the flash exposure produced by a fixed output flash device providing a first predetermined amount of underexposure of a photographic subject located at the near limit acceptable image focus point of an objective lens, and (2) an automatically controlled ambient light exposure which provides a second predetermined amount of underexposure of the photographic subject at all points within the lens' useable depth of field. Advantageously, if the flash illumination provides 75% of a total "correct" exposure (i.e. one-half stop of underexposure) at the near limit acceptable image focus point of the lens, and the ambient light exposure is controlled so that it provides 75% of the total correct exposure, the total exposure, flash plus ambient, is within one-half stop of the correct exposure throughout the useable depth of field of the lens. Accordingly, the exposure control apparatus of the present invention provides inexpensive, mechanically simple and reliable flash photography that was heretofore unavailable for narrow exposure latitude films.

The invention and its objects and advantages will become more apparent by referring to the accompanying drawings and to the ensuing detailed description of a preferred embodiment.

DETAILED DESCRIPTION OF THE PREFERRED EMBODIMENT

Because photographic cameras and electronic flash units are well known, the present description will be directed in particular to elements forming part of, or cooperating more directly with, apparatus in accordance with the present invention. It is to be understood that camera and flash elements not specifically shown or described may be selected from those known to persons having skill in the art.

Figure 1:
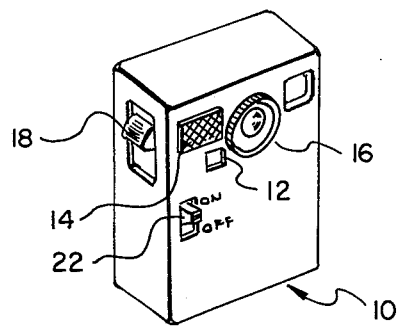
FIG. 1 is a perspective view of a photographic camera and flash device incorporating the exposure control apparatus of the invention.
Figure 2:
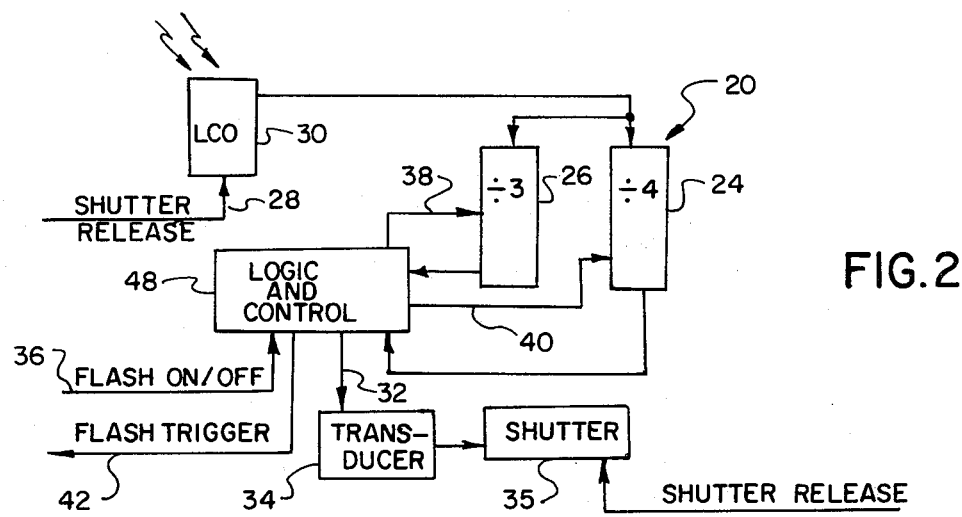
FIG. 2 illustrates in block diagram form, a preferred embodiment of exposure control apparatus in accordance with the present invention.

There is shown in FIG. 1 a photographic camera 10 having an ambient light sensor 12, a non-quenchable electronic strobe flash unit 14, a fixed focus lens 16 having a useable depth of field extending from a near limit acceptable image focus point to infinity, a shutter release 18 and a flash on/off switch 22. The term near limit acceptable image focus point as used herein is given by the equation:

$$D_n = \frac{D}{1 + Dcf/F^2}$$

where
  $D_n$ = Near limit of depth of field
  $D$ = Focused Distance
  $c$ = Limiting circle of confusion
  $f$ = number of lens aperture
  $F$ = Focal length of lens In accordance with the present invention, the camera 10 is provided with circuitry 20, shown in FIG. 2, for controlling, in the flash mode, an exposure of film received in the camera 10 within one-half stop of a nominally correct exposure throughout the useable depth of field of the lens 16.

In the specific embodiment shown in FIG. 2, the circuit 20 has both ambient and flash modes of operation. The circuit 20 operates in the ambient mode when the camera operator moves the flash on/off switch 22 to the OFF position thereby disabling the flash unit 14 and operates in the flash mode when the operator moves the switch 22 to the ON position thereby activating the flash unit 14.

In the ambient mode, a flash OFF signal is sent on line 36 to a logic and control unit 48. Upon receipt of the flash OFF signal, the logic and control unit, which can be a commercially available microprocessor, sends (1) a signal on line 40 to enable a divide-by-four frequency divider 24 and (2) a signal on line 38 to disable a divide-by-three frequency divider 26. To initiate an exposure interval, the shutter release 18 is depressed, causing a camera shutter 35 to be released and a signal to be generated on line 28 that activates a light controlled oscillator (LCO) 30 of the type disclosed in U.S. Pat. No. 3,906,525 issued to Murphy et al on Aug. 1, 1967. When activated the LCO 30 provides an oscillating signal whose frequency varies as a function of the brightness of the ambient light illuminating the photographic scene. The LCO signal is fed to the divide-by-four frequency divider 24. The output signal of the frequency divider 24, which has a pulse repetition rate that is ¼ the repetition rate of the LCO signal is connected to the logic and control unit 48 which counts the cycles of such signal and upon reaching a count number corresponding to a predetermined amount of scene light provides a signal on line 32 that activates a transducer 34 which controls the closing of the shutter to terminate the exposure interval.

The circuit 20 operates in the flash mode as follows. When the flash unit 14 is activated by moving the flash on/off switch 22 to the ON position, a flash ON signal is sent on line 36 to the logic and control unit 48. Upon receipt of the flash ON signal, the logic and control unit 48 sends (1) a signal on line 38 to enable the divide-by-three frequency divider 26 and (2) a signal on line 40 to disable the divide-by-four frequency divider 24. When the shutter release 18 is depressed, the camera shutter is released and the LCO 30 activated as described above in connection with the ambient mode of operation. However, in the flash mode, the LCO signal is fed to the divide-by-three frequency divider 26, the output of which has a repetition rate that is ⅓ the repetition rate of the LCO signal. The logic and control unit 48 counts the cycles of the output signal from the frequency divider 26 and upon reaching the same count number as would have been provided in the ambient mode under the same lighting conditions, provides (1) a flash trigger signal on line 42 to fire the flash unit 14 and (2) a signal on line 32 that activates the transducer 34 which controls the closing of the shutter. The short duration of the flash interval, approximately 1 millisecond, relative to the lag time of the shutter allows the electronic flash unit 14 to be fired at the end of the ambient exposure interval. As a result, the signal count which determines the time of shutter closing is based solely on ambient light. if desired, the flash unit 14 could be fired during the ambient exposure interval provided that (1) the LCO is deactivated during the flash interval (the resulting ambient exposure error will be negligible because of the aforementioned short duration of the flash illumination, or (2) the light-sensitive component of the LCO, for example cadmium sulfide, does not have a frequency response which can respond to the short duration flash illumination. Because the LCO signal is divided by only three in the flash mode, and by four in the ambient mode, the amount of ambient scene light which determines the time of shutter closing in the flash mode is smaller than the amount of ambient scene light which determines the time of shutter closing in the ambient mode. More specifically, the amount of ambient exposure required for shutter closing in the flash mode is 75% of the amount of ambient exposure required in the ambient mode.

Figure 3:
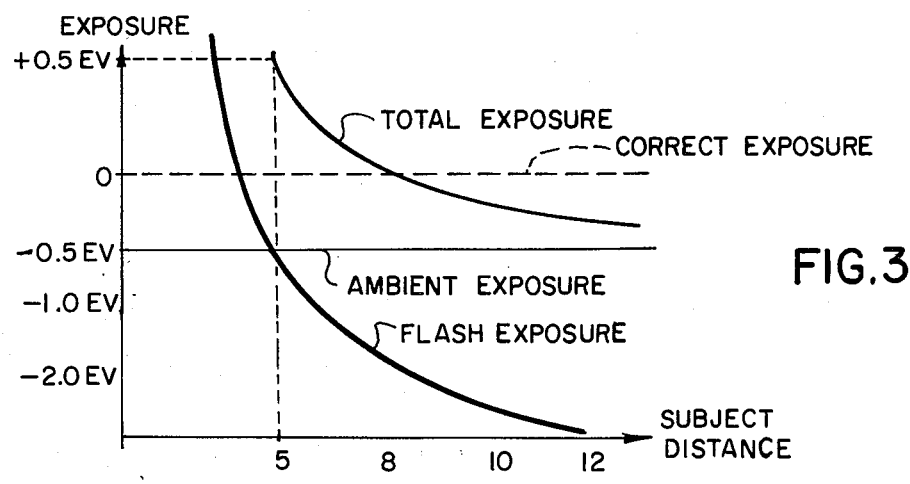
FIG. 3 is a graph showing the ambient light, flash light and total light exposures versus subject distance provided by the exposure control apparatus of FIG. 2 in the flash mode of operation.

In accordance with the teachings of the present invention, the transducer 34 is activated in the ambient mode to initiate the closing of the shutter when the LCO 30 has sensed a quantity of ambient exposure light corresponding to the full nominally correct exposure of the photographic subject. In the flash mode, the transducer 34 is activated to initiate the closing of the shutter when the LCO 30 has sensed a quantity of ambient exposure light corresponding to 75% of the nominally correct exposure which is equivalent to ½ stop of underexposure of the photographic subject. In the flash mode, the aforementioned electronically reduced ambient light exposure is combined with the flash exposure provided by the flash unit 14. In the preferred embodiment of the invention, the flash unit 14 provides ½ stop of underexposure of the photographic subject at the near limit acceptable image focus point of the lens 16. Using an illustrative example wherein the useable depth of field of a 100 mm fixed focus lens is five feet to infinity and assuming an exposure aperture of f/8, a film speed of ASA 160, a flash guide number of 60 and an 18% scene reflectivity, the exposure, due solely to the flash illumination, as shown in FIG. 3, is underexposed one stop at a subject distance of 5.9 feet, two stops at 8.4 feet and three stops at 11.9 feet. The total exposure (i.e. ambient and flash) in the illustrative example is correct at about 8.4 feet and is within ±½ stop of the nominally correct exposure from five feet to infinity.

As will be obvious to one skilled in the art, if the film received in the camera has an exposure latitude greater or less than ±½ stop, the total amount of underexposure provided by the ambient plus flash illumination can be changed accordingly. Furthermore, for any given total amount of underexposure, the ratio of ambient to flash illumination can be varied in order to produce a desird illumination balance.

From the foregoing, it can be seen that the exposure control apparatus of the present invention provides a new concept in flash photography for cameras having an unregulated flash unit. This apparatus is particularly advantageous for cameras adapted to receive narrow exposure latitude film.

The invention has been described in detail with particular reference to a preferred embodiment thereof, but it will be understood that variations and modifications can be effected within the spirit and scope of the invention. For example, in camera applications where it is desired to provide flash illumination for all exposures, the ambient exposure control portion of the present invention can consist simply of a mechanism to close the aperture when a quantity of ambient scene light corresponding to ½ stop of underexposure of a photographic subject has been sensed. Furthermore, while the invention has been described in connection with a camera having a built-in electronic strobe flash unit, the apparatus of the invention can be incorporated in cameras adapted to attachably receive a fixed output flash unit. The flash unit can be either chemical flash, for example a flipflash or magicube, or a low-cost unregulated electronic flash unit.

What is claimed is:

1. In a photographic camera adapted for use with a flash unit having a known, unregulated light output and film having a known film speed and exposure latitude, the camera having a flash exposure mode of operation, shutter means for regulating an exposure interval and an objective lens with a predetermined focal length and fixed aperture providing a useable depth of field extending outwardly from a near acceptable image focus point, the flash unit, in an absence of ambient light, providing flash light which exposes the film a predetermined amount when photographing a subject located at the near acceptable image focus point of the lens, the improvement comprising:

means for firing the flash unit independently of the subject range; and an ambient light exposure control device, coupled to the shutter means, and including means for varying the exposure interval in the flash exposure mode to provide (a) an ambient light exposure which, in the absence of flash light, underexposes the film by a predetermined amount which is within the exposure latitude of the film, and (b) a total ambient light and flash light exposure of the film that is within the exposure latitude of the film throughout the useable depth of field of the lens.

2. In a photographic camera having an objective lens with a predetermined focal length and fixed aperture providing a useable depth of field extending outwardly from a near limit acceptable image focus point and shutter means for regulating an exposure interval, the camera being intended for use with a film having a known film speed and exposure latitude and a flash unit having a known, unregulated flash light output, the improvement comprising:

an ambient light exposure control device coupled to the shutter means, and including means for automatically terminating an exposure interval when a quantity of ambient light received by the film during an exposure provides a first predetermined amount of underexposure of the film;

means for firing the flash unit independently of the range of a photographic subject; and means for correlating an operation of (1) the flash unit which, as a sole source of illumination provides a second predetermined amount of underexposure of the film when the subject is located at the near limit acceptable image focus point of the lens, and (2) the ambient exposure control device such that the total quantity of ambient and flash light reaching the film during an exposure interval is within the exposure latitude of the film throughout the useable depth of field of the lens.

3. The improvement defined in claim 2 wherein said ambient light exposure control device terminates an exposure when the quantity of ambient light received during an exposure provides one-half stop of underexposure of the film.

4. The improvement defined in claim 2 wherein the total ambient and flash light exposure provided to the film throughout the useable depth of field of the lens is within ±one-half stop of the correct exposure.

5. In a photographic camera adapted for use with film having a known film speed and exposure latitude and having an objective lens with a predetermined focal length and fixed aperture providing a useable depth of field extending from a near limit acceptable image focus point to infinity and shutter means for regulating an exposure interval, the combination comprising:

(a) an exposure circuit including (i) a light sensor for sensing intensity of ambient light reflected from a photographic scene during an exposure interval and for providing an output signal indicative of such intensity and (ii) electronic adjustment means coupled to the light sensor, the adjustment means having a daylight mode and a flash light mode and being operable in the daylight mode for producing an output signal which is proportional to the output signal of the light sensor by a first factor and operable in the flash light mode for producing an output signal which is proportional to the output signal of the light sensor by a second factor that is greater than the first factor;

(b) a flash unit for emitting, when enabled, a fixed quantity of light toward the scene, the flash unit providing a predetermined underexposure of a photographic subject located at the near limit acceptable image focus point of the lens; and (c) switch means for enabling the flash unit independently of the range of the subject; and (d) logic and control means for controlling the adjustment means and the shutter means, the logic and control means being responsive to the enablement of the flash unit for selectively switching the adjustment means from its daylight mode to its flash mode and responsive to the output signal of the adjustment means reaching a predetermined level for causing the shutter means to terminate an exposure.

6. The combination defined in claim 5 wherein said flash unit comprises an electronic flash unit operating in a non-quench mode.

7. The combination defined in claim 5 wherein said logic and control means causes the shutter means to terminate an exposure in the flash light mode when said light sensor has sensed a quantity of ambient exposure light corresponding to ½ stop of underexposure of the film and in the daylight mode when said light sensor has sensed a quantity of ambient exposure light corresponding to a nominally correct exposure of the film.

8. In a photographic camera adapted for use with film having a predetermined film speed and exposure latitude and a flash unit providing a known, fixed flash light output, the camera having an objective lens with a predetermined focal length and fixed aperture providing a useable depth of field extending outwardly from a near limit acceptable image focus point, photoresponsive means for measuring intensity of ambient light reflected from a photographic scene during an exposure interval and for providing an output signal indicative of such intensity, and shutter means for regulating an exposure interval, the improvement comprising:

means coupled to the shutter means and responsive to the output signal of the photoresponsive means for automatically varying the exposure interval so as to cause, at the measured ambient scene light, the film to be underexposed by a predetermined ambient underexposure factor, and means for firing the flash unit independently of the range of a photographic subject, the flash unit providing flash light to a subject of a predetermined reflectivity located at the near limit acceptable image focus point of the lens so as to cause the film to be underexposed by predetermined flash underexposure factor, the predetermined ambient and flash underexposure factors being determined such that at the predetermined fixed lens aperture and automatically selected exposure interval, the total flash and ambient light reaching the film is within the exposure latitude of the film throughout the useable depth of field of the lens.

9. A method of exposing a photographic film having a known film speed and exposure latitude in a camera having an objective lens with a predetermined focal length and fixed aperture providing a useful depth of field extending outwardly from a near limit acceptable image focus point of the lens, said method comprising:

exposing the film to a subject illuminated by ambient light;

terminating the exposure when a predetermined amount of underexposure to ambient light has been achieved; and before terminating the exposure, and independently of the subject range, illuminating the subject with a fixed quantity of flash illumination which, in the absence of ambient light, would provide a predetermined amount of underexposure to a subject located at the near limit acceptable image focus point of the lens, which quantity of flash illumination when added to the quantity of ambient light received by the film, results in a total exposure that is within the exposure latitude of the film throughout the useable depth of field of the lens.

* * * * *